(12) United States Patent
Venugopal et al.

(10) Patent No.: US 12,156,062 B2
(45) Date of Patent: Nov. 26, 2024

(54) TECHNIQUES FOR INDICATING BEAMS FOR USER EQUIPMENT BEAM REPORTING

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/247,165

(22) Filed: Dec. 2, 2020

(65) Prior Publication Data

US 2021/0235307 A1    Jul. 29, 2021

Related U.S. Application Data

(60) Provisional application No. 62/967,348, filed on Jan. 29, 2020.

(51) Int. Cl.
*H04W 24/10* (2009.01)
*H04W 16/28* (2009.01)
(Continued)

(52) U.S. Cl.
CPC ........... *H04W 24/10* (2013.01); *H04W 16/28* (2013.01); *H04L 5/0048* (2013.01); *H04W 56/001* (2013.01)

(58) Field of Classification Search
CPC . H04W 16/28; H04W 24/10; H04W 36/0044; H04W 56/001; H04L 5/0048–0057
See application file for complete search history.

(56) References Cited

U.S. PATENT DOCUMENTS

2013/0301454 A1   11/2013   Seol et al.
2018/0220403 A1   8/2018   John Wilson et al.
(Continued)

FOREIGN PATENT DOCUMENTS

| EP | 3535864 A1 | 9/2019 |
| WO | 2018151635 A1 | 8/2018 |
| WO | 2018223426 A1 | 12/2018 |

OTHER PUBLICATIONS

International Search Report and Written Opinion—PCT/US2020/070844—ISA/EPO—Feb. 2, 2021.

*Primary Examiner* — Michael Thier
*Assistant Examiner* — Prince A Mensah
(74) *Attorney, Agent, or Firm* — Dalei Dong; Harrity & Harrity, LLP

(57) ABSTRACT

Various aspects of the present disclosure generally relate to indicating beams for user equipment beam reporting. In some aspects, a user equipment (UE) may receive, from a base station, an indication of a plurality of candidate beams on which the base station is able to simultaneously transmit communications to the UE, and determine a first beam and a second beam from among the plurality of candidate beams, based at least in part on one or more measurements of the plurality of candidate beams. The UE may transmit an indication of the first beam and the second beam to the base station, and receive communications simultaneously on the first beam and the second beam. Numerous other aspects are provided.

31 Claims, 10 Drawing Sheets

(51) Int. Cl.
    *H04L 5/00*       (2006.01)
    *H04W 56/00*      (2009.01)

(56)            References Cited

U.S. PATENT DOCUMENTS

| | | | |
|---|---|---|---|
| 2019/0037426 A1* | 1/2019 | Yu | H04W 24/10 |
| 2019/0254082 A1* | 8/2019 | Takeda | H04W 16/28 |
| 2019/0288766 A1* | 9/2019 | Ng | H04B 7/0404 |
| 2020/0007208 A1 | 1/2020 | Zhou et al. | |
| 2020/0021350 A1* | 1/2020 | Koskela | H04W 16/28 |
| 2020/0037188 A1* | 1/2020 | Schrammar | H04W 16/28 |
| 2020/0059290 A1* | 2/2020 | Pan | H04B 7/088 |
| 2020/0077320 A1* | 3/2020 | Shimoda | H04W 36/0044 |
| 2020/0314708 A1* | 10/2020 | Jassal | H04W 72/046 |
| 2021/0022015 A1* | 1/2021 | Oh | H04L 5/0051 |
| 2021/0022130 A1* | 1/2021 | Gao | H04L 5/0051 |
| 2021/0119680 A1* | 4/2021 | Matsumura | H04B 7/0695 |
| 2021/0274372 A1* | 9/2021 | Shi | H04L 5/0048 |
| 2021/0391897 A1* | 12/2021 | Wang | H04B 7/024 |
| 2022/0038194 A1* | 2/2022 | Matsumura | H04L 5/005 |
| 2022/0052733 A1* | 2/2022 | Zhu | H04W 24/10 |
| 2022/0053544 A1* | 2/2022 | Kang | H04B 17/373 |
| 2022/0094399 A1* | 3/2022 | Gao | H04B 7/0417 |

\* cited by examiner

TECHNIQUES FOR INDICATING BEAMS FOR USER EQUIPMENT BEAM REPORTING

CROSS-REFERENCE TO RELATED APPLICATION

This patent application claims priority to U.S. Provisional Patent Application No. 62/967,348, filed on Jan. 29, 2020, entitled "TECHNIQUES FOR INDICATING BEAMS FOR USER EQUIPMENT BEAM REPORTING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for indicating beams for user equipment beam reporting.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, an indication of a plurality of candidate beams on which the base station is able to simultaneously transmit communications to the UE, and determining a first beam and a second beam from among the plurality of candidate beams, based at least in part on one or more measurements of the plurality of candidate beams. The method may include transmitting an indication of the first beam and the second beam to the base station.

In some aspects, determining the first beam and the second beam includes determining whether a candidate beam is associated with a set of beams.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the method includes receiving a message from the base station, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the method includes receiving a message from the base station, the message indicating a mapping between the plurality of indices and respective sets of beams in the plurality of candidate beams.

In some aspects, the indication of the plurality of candidate beams includes an index that corresponds to identifiers for beams in the plurality of candidate beams, and determining the first beam and the second beam includes determining the first beam and the second beam from among beams with identifiers that correspond to the index.

In some aspects, the method includes receiving a message from the base station, the message indicating a mapping between the index and the identifiers.

In some aspects, determining the first beam and the second beam includes determining the first beam and the second beam based at least in part on an order of the plurality of candidate beams in the indication of the plurality of candidate beams.

In some aspects, the method includes receiving a message from the base station, the message indicating a mapping between the order of the plurality of candidate beams and respective sets of beams in the plurality of candidate beams.

In some aspects, receiving the indication of the plurality of candidate beams includes receiving the indication of the plurality of candidate beams in one or more of a channel state information reference signal resource indicator (CRI) or a synchronization signal physical broadcast channel (SSB) resource block indicator.

In some aspects, receiving the indication of the plurality of candidate beams includes receiving the indication of the plurality of candidate beams in one or more of a radio resource configuration (RRC) message, a medium access control control element (MAC-CE), or downlink control information (DCI).

In some aspects, a method of wireless communication, performed by a base station, may include determining a plurality of candidate beams on which the base station may simultaneously transmit communications to a UE, and transmitting an indication of the plurality of candidate beams to the UE. The method may include receiving, from the UE, an indication of a first beam and a second beam on which the UE can simultaneously receive communications from the base station.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the method may include transmitting a message to the UE, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the method may include transmitting a message to the UE, the message indicating a mapping between the plurality of indices and respective sets of beams in the plurality of candidate beams.

In some aspects, the method may include ordering beams of the plurality of candidate beams in the indication of the plurality of candidate beams based at least in part on a priority of availability for the base station.

In some aspects, the method may include transmitting a message to the UE, the message indicating a mapping between an order of the plurality of candidate beams in the indication of the plurality of candidate beams and respective beams of the plurality of candidate beams.

In some aspects, transmitting the indication of the plurality of candidate beams includes transmitting the indication of the plurality of candidate beams in one or more of a CRI or an SSB resource block indicator.

In some aspects, transmitting the indication of the plurality of candidate beams includes transmitting the indication of the plurality of candidate beams in one or more of an RRC message, a MAC-CE, or DCI.

In some aspects, a UE for wireless communication may include memory and one or more processors coupled to the memory. The memory and the one or more processors may be configured to receive, from a base station, an indication of a plurality of candidate beams on which the base station is able to simultaneously transmit communications to the UE, and determine a first beam and a second beam from among the plurality of candidate beams, based at least in part on one or more measurements of the plurality of candidate beams. The memory and the one or more processors may be configured to transmit an indication of the first beam and the second beam to the base station.

In some aspects, the memory and the one or more processors are configured to determine the first beam and the second beam by determining whether a candidate beam is associated with a respective set of beams.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the memory and the one or more processors are configured to receive a message from the base station, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the memory and the one or more processors are configured to receive a message from the base station, the message indicating a mapping between the plurality of indices and respective sets of beams in the plurality of candidate beams.

In some aspects, the indication of the plurality of candidate beams includes an index that corresponds to identifiers for beams in the plurality of candidate beams, and the memory and the one or more processors are configured to determine the first beam and the second beam from among beams with identifiers that correspond to the index.

In some aspects, the memory and the one or more processors are configured to receive a message from the base station, the message indicating a mapping between the index and the identifiers.

In some aspects, the memory and the one or more processors are configured to determine the first beam and the second beam based at least in part on an order of the plurality of candidate beams in the indication of the plurality of candidate beams.

In some aspects, the memory and the one or more processors are configured to receive a message from the base station, the message indicating a mapping between the order of the plurality of candidate beams and respective sets of beams in the plurality of candidate beams.

In some aspects, the memory and the one or more processors are configured to receive the indication of the plurality of candidate beams in one or more of a CRI or an SSB resource block indicator.

In some aspects, the memory and the one or more processors are configured to receive the indication of the plurality of candidate beams in one or more of an RRC message, a MAC-CE, or DCI.

In some aspects, a base station for wireless communication may include memory and one or more processors coupled to the memory. The memory and the one or more processors may be configured to determine a plurality of candidate beams on which the base station may simultaneously transmit communications to a UE, and transmit an indication of the plurality of candidate beams to the UE. The memory and the one or more processors may be configured to receive, from the UE, an indication of a first beam and a second beam on which the UE can simultaneously receive communications from the base station.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the memory and the one or more processors are configured to transmit a message to the UE, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the memory and the one or more processors are configured to transmit a message to the UE, the message indicating a mapping between the plurality of indices and respective sets of beams in the plurality of candidate beams.

In some aspects, the memory and the one or more processors are configured to order beams of the plurality of candidate beams in the indication of the plurality of candidate beams based at least in part on a priority of availability for the base station.

In some aspects, the memory and the one or more processors are configured to transmit a message to the UE, the message indicating a mapping between an order of the plurality of candidate beams in the indication of the plurality of candidate beams and respective beams of the plurality of candidate beams.

In some aspects, the memory and the one or more processors are configured to transmit the indication of the plurality of candidate beams in one or more of a CRI or an SSB resource block indicator.

In some aspects, the memory and the one or more processors are configured to transmit the indication of the plurality of candidate beams in one or more of an RRC message, a MAC-CE, or DCI.

In some aspects, a non-transitory computer-readable medium may store one or more instructions for wireless communication. The one or more instructions, when executed by one or more processors of a UE, may cause the one or more processors to receive, from a base station, an indication of a plurality of candidate beams on which the base station is able to simultaneously transmit communications to the UE, determine a first beam and a second beam from among the plurality of candidate beams, based at least in part on one or more measurements of the plurality of candidate beams, transmit an indication of the first beam and the second beam to the base station.

In some aspects, the one or more instructions, when executed by the one or more processors of the UE, cause the one or more processors to determine the first beam and the second beam by determining whether a candidate beam is associated with a set of beams.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the one or more instructions, when executed by the one or more processors of the UE, cause the one or more processors to receive a message from the base station, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the one or more instructions, when executed by the one or more processors of the UE, cause the one or more processors to receive a message from the base station, the message indicating a mapping between the plurality of indices and respective sets of beams in the plurality of candidate beams.

In some aspects, the indication of the plurality of candidate beams includes an index that corresponds to identifiers for beams in the plurality of candidate beams, and the one or more instructions, when executed by the one or more processors of the UE, cause the one or more processors to determine the first beam and the second beam from among beams with identifiers that correspond to the index.

In some aspects, the one or more instructions, when executed by the one or more processors of the UE, cause the one or more processors to receive a message from the base station, the message indicating a mapping between the index and the identifiers.

In some aspects, the one or more instructions, when executed by the one or more processors of the UE, cause the one or more processors to determine the first beam and the second beam based at least in part on an order of the plurality of candidate beams in the indication of the plurality of candidate beams.

In some aspects, the one or more instructions, when executed by the one or more processors of the UE, cause the one or more processors to receive a message from the base station, the message indicating a mapping between the order of the plurality of candidate beams and respective sets of beams in the plurality of candidate beams.

In some aspects, the one or more instructions, when executed by the one or more processors of the UE, cause the one or more processors to receive the indication of the plurality of candidate beams in one or more of a CRI or an SSB resource block indicator.

In some aspects, the one or more instructions, when executed by the one or more processors of the UE, cause the one or more processors to receive the indication of the plurality of candidate beams in one or more of an RRC message, a MAC-CE, or DCI.

In some aspects, a non-transitory computer-readable medium may store one or more instructions for wireless communication. The one or more instructions, when executed by one or more processors of a base station, may cause the one or more processors to determine a plurality of candidate beams on which the base station may simultaneously transmit communications to a UE, transmit an indication of the plurality of candidate beams to the UE, receive, from the UE, an indication of a first beam and a second beam on which the UE can simultaneously receive communications from the base station.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the one or more instructions, when executed by the one or more processors of the base station, cause the one or more processors to transmit a message to the UE, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the one or more instructions, when executed by the one or more processors of the base station, cause the one or more processors to transmit a message to the UE, the message indicating a mapping between the plurality of indices and respective sets of beams in the plurality of candidate beams.

In some aspects, the one or more instructions, when executed by the one or more processors of the base station, cause the one or more processors to order beams of the plurality of candidate beams in the indication of the plurality of candidate beams based at least in part on a priority of availability for the base station.

In some aspects, the one or more instructions, when executed by the one or more processors of the base station, cause the one or more processors to transmit a message to the UE, the message indicating a mapping between an order of the plurality of candidate beams in the indication of the plurality of candidate beams and respective beams of the plurality of candidate beams.

In some aspects, the one or more instructions, when executed by the one or more processors of the base station, cause the one or more processors to transmit the indication of the plurality of candidate beams in one or more of a CRI or an SSB resource block indicator.

In some aspects, the one or more instructions, when executed by the one or more processors of the base station, cause the one or more processors to transmit the indication of the plurality of candidate beams in one or more of an RRC message, a MAC-CE, or DCI.

In some aspects, an apparatus for wireless communication may include means for receiving, from a base station, an indication of a plurality of candidate beams on which the base station is able to simultaneously transmit communications to the apparatus, means for determining a first beam and a second beam from among the plurality of candidate beams, based at least in part on one or more measurements of the plurality of candidate beams, and means for transmitting an indication of the first beam and the second beam to the base station.

In some aspects, the means for determining the first beam and the second beam includes means for determining whether a candidate beam is associated with a set of beams.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the apparatus includes means for receiving a message from the base station, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the apparatus includes means for receiving a message from the base station, the message indicating a mapping between the plurality of indices and respective sets of beams in the plurality of candidate beams.

In some aspects, the indication of the plurality of candidate beams includes an index that corresponds to identifiers for beams in the plurality of candidate beams, and the means for determining the first beam and the second beam includes means for determining the first beam and the second beam from among beams with identifiers that correspond to the index.

In some aspects, the apparatus includes means for receiving a message from the base station, the message indicating a mapping between the index and the identifiers.

In some aspects, the means for determining the first beam and the second beam includes means for determining the first beam and the second beam based at least in part on an order of the plurality of candidate beams in the indication of the plurality of candidate beams.

In some aspects, the apparatus includes means for receiving a message from the base station, the message indicating a mapping between the order of the plurality of candidate beams and respective sets of beams in the plurality of candidate beams.

In some aspects, the means for receiving the indication of the plurality of candidate beams includes means for receiving the indication of the plurality of candidate beams in one or more of a CRI or an SSB resource block indicator.

In some aspects, the means for receiving the indication of the plurality of candidate beams includes means for receiving the indication of the plurality of candidate beams in one or more of an RRC message, a MAC-CE, or DCI.

In some aspects, an apparatus for wireless communication may include means for determining a plurality of candidate beams on which the apparatus may simultaneously transmit communications to a UE, means for transmitting an indication of the plurality of candidate beams to the UE, and means for receiving, from the UE, an indication of a first beam and a second beam on which the UE can simultaneously receive communications from the base station.

In some aspects, each of the plurality of candidate beams is associated with a respective set of beams, and the first beam and the second beam are from different sets of beams.

In some aspects, the indication of the plurality of candidate beams includes a plurality of indices that each correspond to a respective beam in the plurality of candidate beams.

In some aspects, the apparatus includes means for transmitting a message to the UE, the message indicating a mapping between the plurality of indices and respective beams in the plurality of candidate beams.

In some aspects, the indication of the plurality of candidate beams includes a plurality of indices that each correspond to a respective set of beams in the plurality of candidate beams.

In some aspects, the apparatus includes means for transmitting a message to the UE, the message indicating a mapping between the plurality of indices and respective sets of beams in the plurality of candidate beams.

In some aspects, the apparatus includes means for ordering beams of the plurality of candidate beams in the indication of the plurality of candidate beams based at least in part on a priority of availability for the base station.

In some aspects, the apparatus includes means for transmitting a message to the UE, the message indicating a mapping between an order of the plurality of candidate beams in the indication of the plurality of candidate beams and respective beams of the plurality of candidate beams.

In some aspects, the means for transmitting the indication of the plurality of candidate beams includes means for transmitting the indication of the plurality of candidate beams in one or more of a CRI or an SSB resource block indicator.

In some aspects, the means for transmitting the indication of the plurality of candidate beams includes means for transmitting the indication of the plurality of candidate beams in one or more of an RRC message, a MAC-CE, or DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
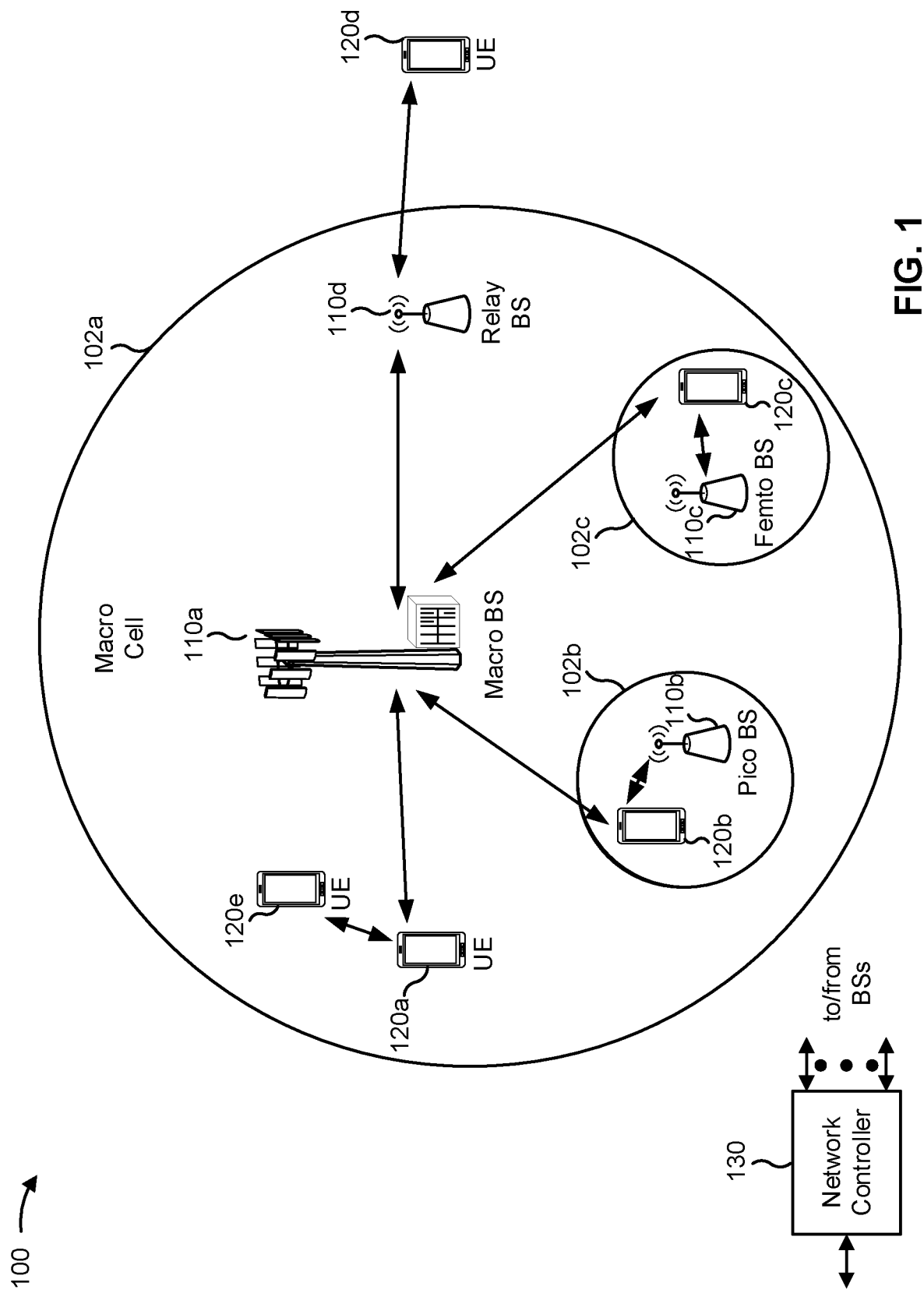
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
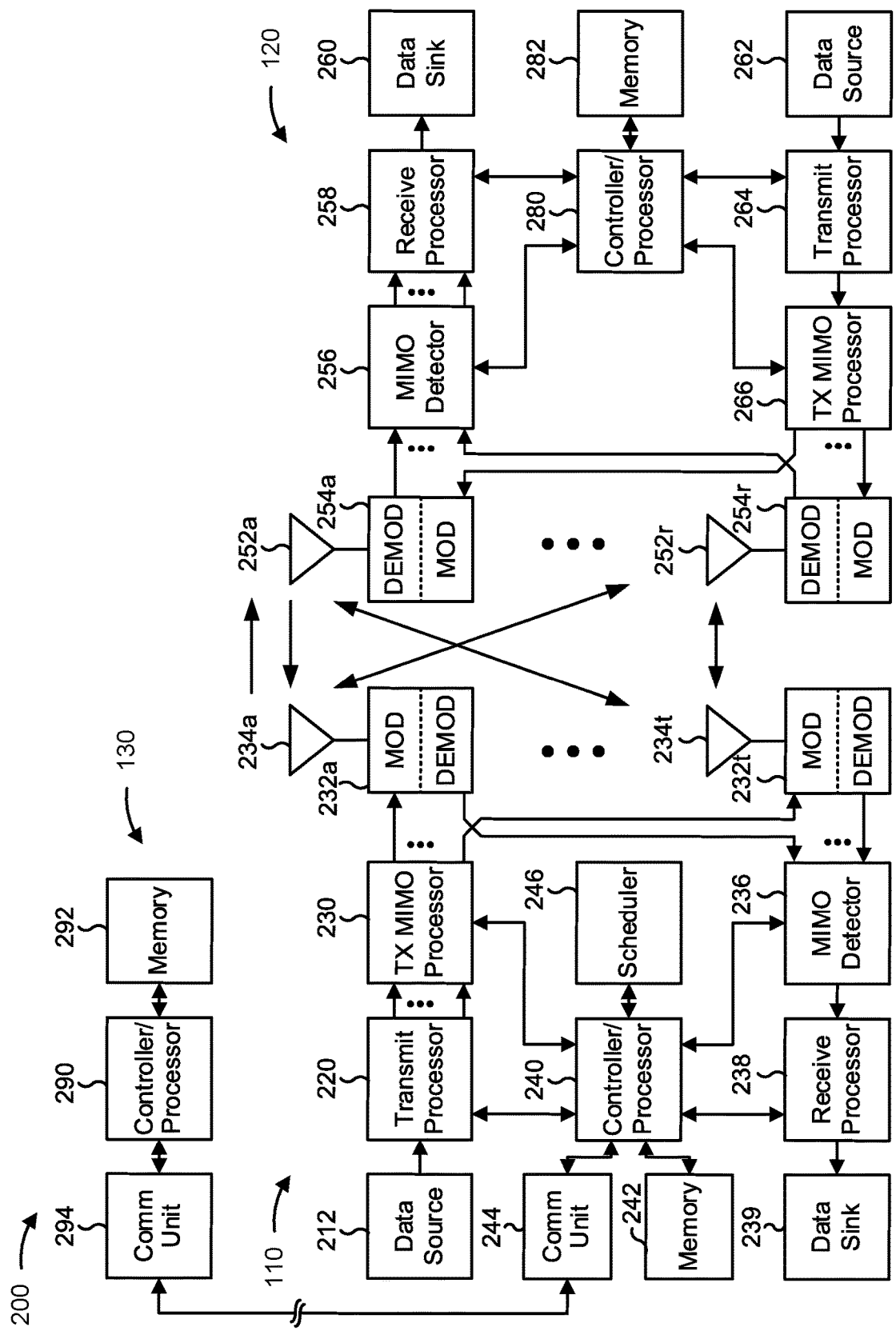
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor May determine reference signal received power (RSRP), received signal strength indicator (RSSI), reference signal received quality (RSRQ), CQI, and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating beams for user equipment beam reporting, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, a candidate beam may comprise a channel state information reference signal (CSI-RS) resource and/or a synchronization signal block (SSB) resource. A resource may have associated transmission configuration indicator states, spatial filter parameters, and/or quasi-colocation properties. For ease of explanation, such a resource may be referred to as a beam in the examples described herein.

In some aspects, UE 120 may include means for receiving, from a base station, an indication of a plurality of candidate beams on which the base station is able to simultaneously transmit communications to the UE, means for determining a first beam and a second beam from among the plurality of candidate beams, based at least in part on one or more measurements of the plurality of candidate beams, means for transmitting an indication of the first beam and the second beam to the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a plurality of candidate beams on which the base station may simultaneously transmit communications to a UE, means for transmitting an indication of the plurality of candidate beams to the UE, means for receiving, from the UE, an indication of a first beam and a second beam on which the UE can simultaneously receive communications from the base station, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
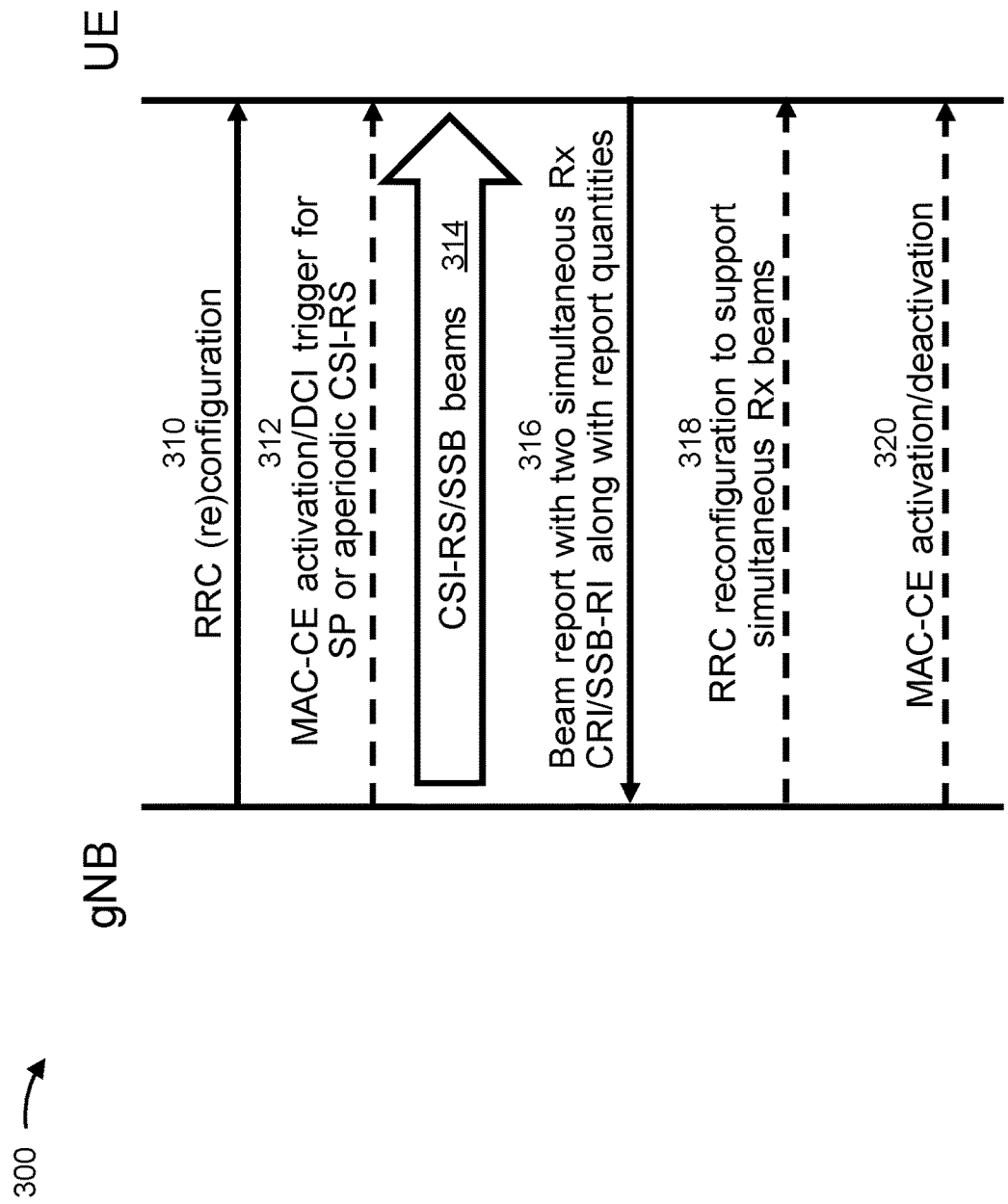
FIG. 3 illustrates a procedure for beam reporting by a UE for simultaneous beam communications.

FIG. 3 illustrates an example procedure 300 for beam reporting by a UE for simultaneous beam communications. A base station (e.g., gNB) may plan to transmit on two beams simultaneously, and a corresponding UE may plan to receive on the two beams simultaneously. Accordingly, the gNB and the UE may begin to establish communications via a radio resource control (RRC) configuration message (e.g., CSI-MeasConfig, CSI-ReportConfig, CSI-ResourceConfig), as shown by reference number 310. The gNB may transmit a medium access control control element (MAC-CE) or use a downlink control information (DCI) trigger to activate semi-persistent or aperiodic CSI-RSs, as shown by reference number 312. The base station may transmit the CSI-RSs or SSBs on a plurality of beams, as shown by reference number 314. The UE may measure the beams and report, to the gNB, channel information and/or interference information. The UE may report the channel information and/or interference information. For example, the UE may report CSI-RS resource indicator (CRIs) or synchronization signal physical broadcast channel (SSB) resource block indicators (SSB-RIs) in a message, as shown by reference number 316. The message may also include an associated report number (e.g., RSRP or signal to interference plus noise ratio (SINR)). The gNB may transmit an RRC reconfiguration message to the UE, as shown by reference number 318, based at least in part on the report from the UE, and transmit a MAC-CE activation or deactivation message, as shown by reference number 320. The gNB may then transmit communications to the UE on the first beam and the second beam simultaneously. The two beams may belong to the same transmission and reception point (TRP) or to different TRPs. A TRP may be associated with a set of beams.

As indicated above, FIG. 3 is provided as an example. Other examples may differ from what is described with regard to FIG. 3.

In some scenarios, if the gNB is not able to simultaneously transmit on the two beams, the UE may report one or two other beams after learning that the gNB will not simultaneously transmit on the two beams. These extra steps, to establish communications on one or two other beams that the gNB can handle may cause the UE and the gNB to waste power, processing resources, and signaling resources.

According to various aspects described herein, the gNB may determine candidate beams on which the gNB may transmit simultaneously. The gNB may indicate the candidate beams to the UE, and the UE may select the two beams from the candidate beams. In some aspects, the gNB may signal the candidate beams with an indication that includes an index (e.g., TRP index, physical cell identity index, control resource set pool index) that corresponds to a candidate beam or a candidate beam set (group). The candidate beams may include more than one set of candidate beams, and the UE may select two beams that are in different sets of candidate beams. The UE and the base station may be able to communicate on the two beams simultaneously without having to restart the beam reporting procedure with the gNB. The UE and the gNB may thus save power, processing resources, and signaling resources.

Figure 4:
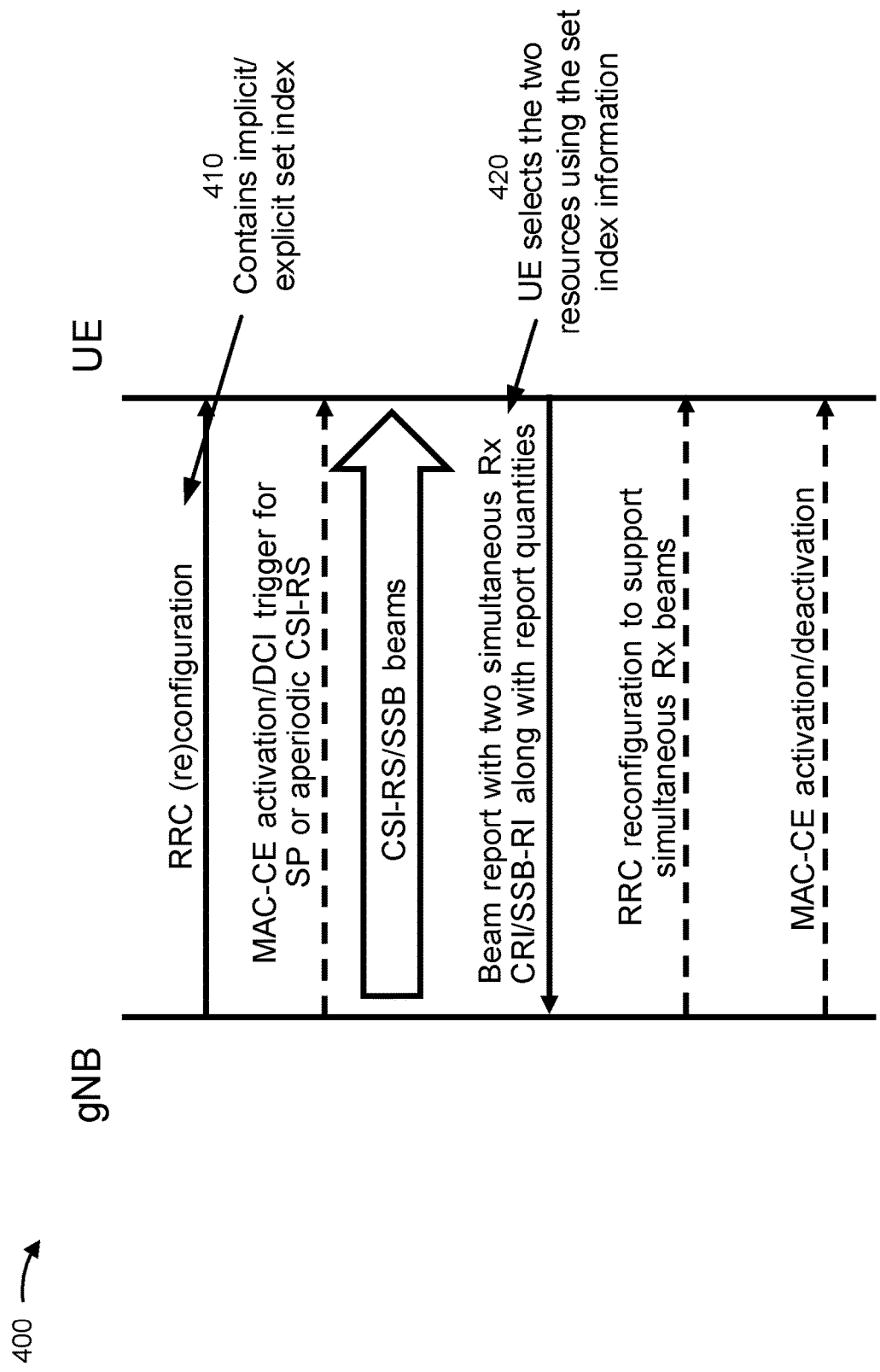
FIG. 4 illustrates a procedure for beam reporting by a UE for simultaneous beam communications, in accordance with various aspects of the present disclosure.

FIG. 4 illustrates an example procedure 400 for beam reporting by a UE for simultaneous beam communications, in accordance with various aspects of the present disclosure. FIG. 4 shows a gNB that may communicate with a UE, similar to the procedure shown in connection with FIG. 3.

In some aspects, the gNB may indicate beams that the gNB may simultaneously transmit on. As shown by reference number 410, the indication may be included in an RRC configuration message, a MAC-CE, DCI, CRI, SSB resource indicator, and/or the like. The indication may also be indicated in an existing information element (IE) (e.g., NZP-CSI-RS-Resource IE, CSI-SSB-ResourceSet IE, NZP-CSI-RS-ResourceSet IE), or a new IE. Additionally, or alternatively, the gNB may use an existing IE or a new IE to configure the UE with a mapping between each beam set index and corresponding beams (resources). The mapping may include associated RS resource identifiers (IDs) or resource set IDs.

In some aspects, the gNB may implicitly indicate a candidate beam or a candidate beam set, by indicating an index for a candidate beam or candidate beam set. The UE may determine the candidate beams based at least in part on the index, as shown by reference number 420. For example, beams with RS resource set IDs of 0, 2, 4, 6, . . . may have a beam set index of 0, while beams with RS resource sets with IDs of 1, 3, 5, 7, . . . may have a beam set index of 1. The gNB and the UE may use a mapping rule that associates indices with resource set IDs for candidate beams. The gNB may configure the UE with the mapping rule (e.g., via RRC, MAC-CE, DCI).

In some aspects, a UE may determine candidate beams based at least in part on an order of beams in an indication. The beams may be part of a list used for defining sets of beams. For example, beams with an ordering of 0, 2, 4, 6, . . . in the list may have beam set index of 0, while sets of beams with ordering of 1, 3, 5, 7, . . . in the list have beam set index of 1. The gNB may configure the UE with a mapping rule or list for associating an order of beams in an indication with an index or identifier of a beam.

As indicated above, FIG. 4 is provided as an example. Other examples may differ from what is described with regard to FIG. 4.

Figure 5:
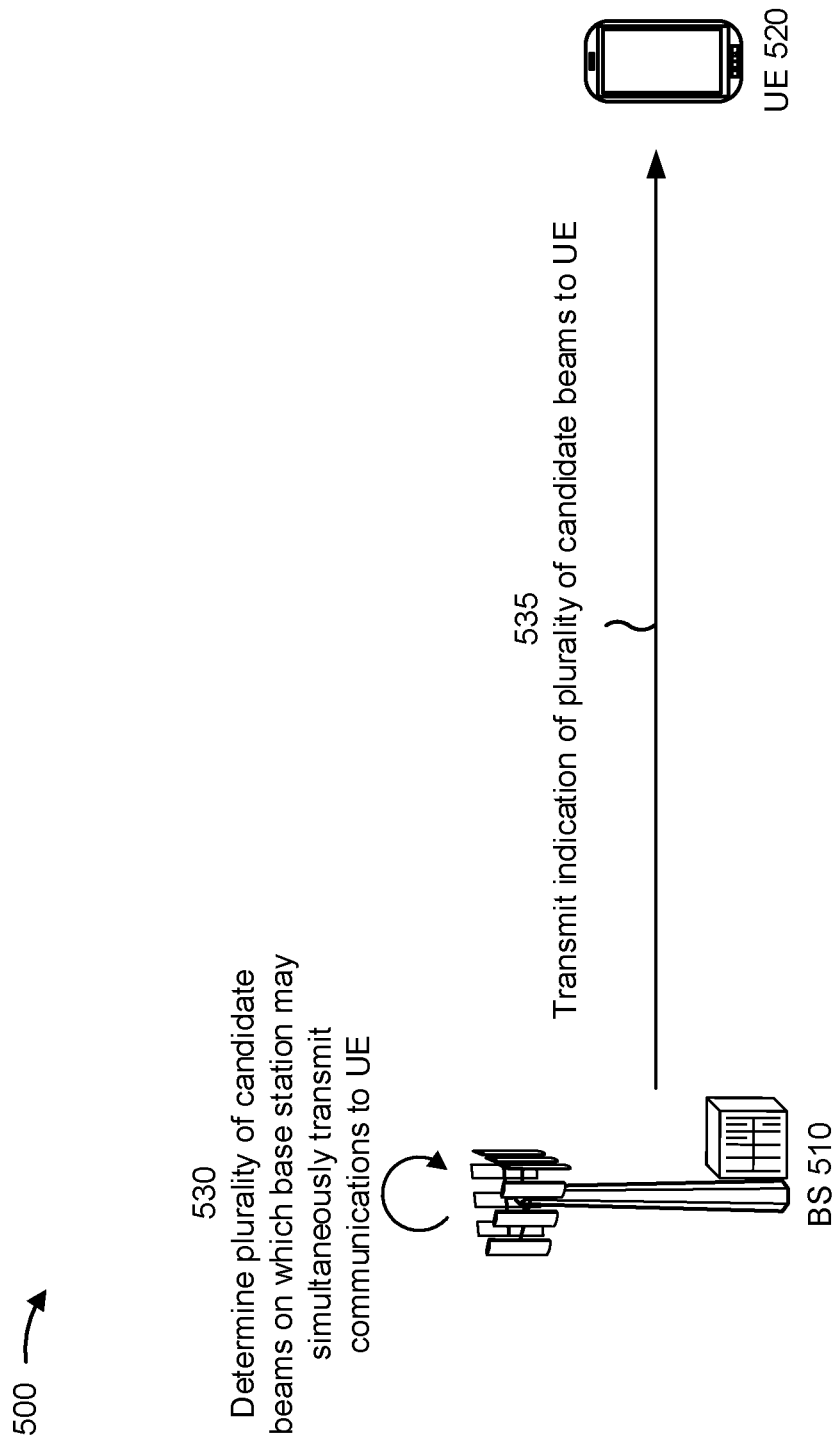
FIGS. 5 and 6 are diagrams that illustrate an example of indicating beams for UE beam reporting, in accordance with various aspects of the present disclosure.
Figure 6:
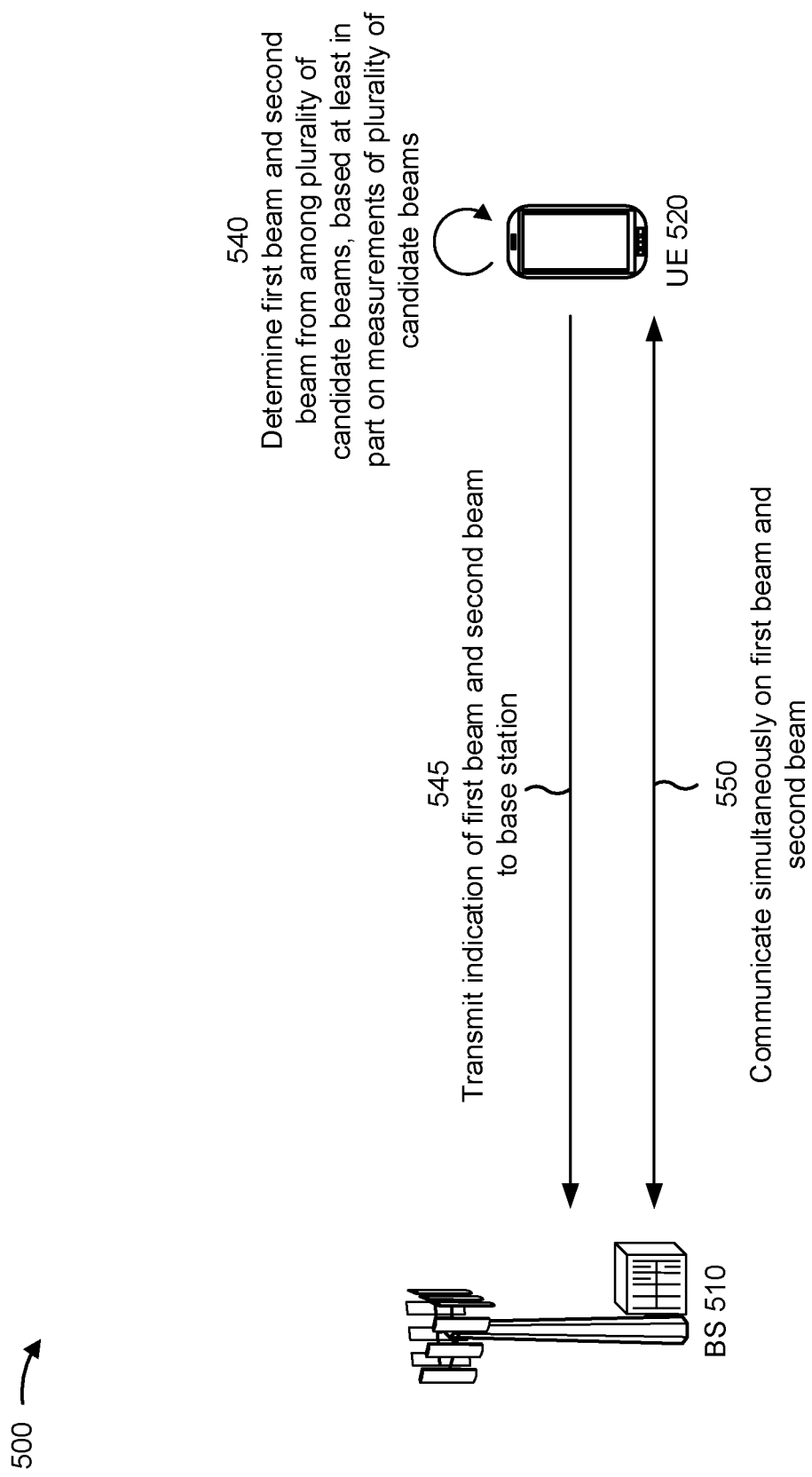

FIGS. 5 and 6 are diagrams that illustrate an example 500 of indicating beams for UE beam reporting, in accordance with various aspects of the present disclosure. FIGS. 5 and 6 show a BS 510 (e.g., BS 110 depicted in FIGS. 1 and 2, the gNB depicted in FIGS. 3 and 4) that may communicate with a UE 520 (e.g., UE 120 depicted in FIGS. 1 and 2, the UE depicted in FIGS. 3 and 4). BS 510 may simultaneously transmit communications to UE 520 on at least two beams.

As shown by FIG. 5, and by reference number 530, BS 510 may determine a plurality of candidate beams on which BS 510 may simultaneously transmit communications to UE 520. BS 510 may determine the plurality of candidate beams, based at least in part on a capability of the UE, a location of the UE, a speed of the UE, a direction of the UE, a predicted location or path of the UE, feedback from the UE, and/or the like.

As shown by reference number 535, BS 510 may transmit an indication of the plurality of candidate beams to UE 520. The indication may include an explicit beam identifier or beam set identifier. The indication may be an implicit identifier, where UE 520 may determine candidate beams based at least in part on the indication. The UE may have received a message from the gNB configuring the UE for implicit determinations.

FIG. 6 shows a continuation of example 500. As shown by FIG. 6, and by reference number 540, UE 520 may determine a first beam and a second beam for simultaneous reception of communications from BS 510. UE 520 may determine the first beam and the second beam based at least in part on measurements (e.g., SINR and/or the like) of one or more of the candidate beams. UE 520 may compare a beam measurement to a threshold and select a beam based at least in part on the comparison. In some aspects, UE 520 may measure each of the candidate beams indicated by BS 510. Additionally, or alternatively, UE 520 may determine more than two beams to report for simultaneous transmission.

As shown by reference number 545, UE 520 may transmit an indication of the first beam and the second beam to BS 510. As shown by reference number 550, BS 510 and UE 520 may communicate by simultaneous transmission and reception on the first beam and the second beam.

In some aspects, after receiving a report (e.g., groupBasedBeamReport) from UE 520, BS 510 may transmit a message or instruction to UE 520 that the first beam and the second beam cannot be processed simultaneously and to not group them together until further notice. This message may be a grouping or set indication that bars a set of beams.

As indicated above, FIGS. 5 and 6 are provided as an example. Other examples may differ from what is described with regard to FIGS. 5 and 6.

Figure 7:
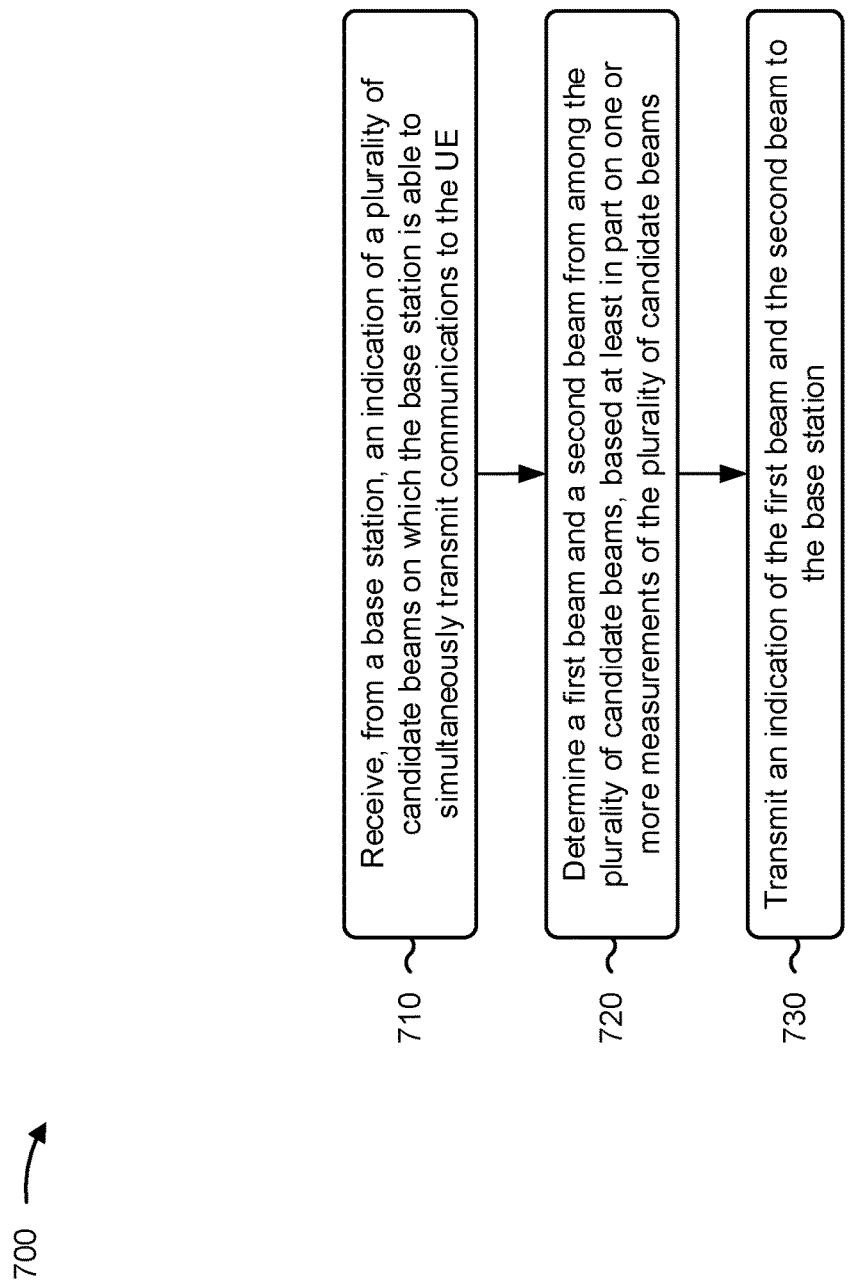
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, the UE depicted in FIGS. 3 and 4, UE 520 depicted in FIGS. 5 and 6) performs operations associated with techniques for indicating beams for UE beam reporting.

As shown in FIG. 7, in some aspects, process 700 may include receiving, from a base station, an indication of a plurality of candidate beams on which the base station is able to simultaneously transmit communications to the UE (block 710). For example, the UE (e.g., using receive processor 258, transmit processor 264, controller/processor 280, memory 282) may receive, from a base station, an indication of a plurality of candidate beams on which the base station is able to simultaneously transmit communications to the UE, as described above. In some aspects, the operation of block 710 may be performed by reception component 904 of FIG. 9.

As further shown in FIG. 7, in some aspects, process 700 may include determining a first beam and a second beam from among the plurality of candidate beams, based at least in part on one or more measurements of the plurality of candidate beams (block 720). For example, the UE (e.g., using receive processor 258, transmit processor 264, controller/processor 280, memory 282, and/or the like) may determine a first beam and a second beam from among the plurality of candidate beams, based at least in part on one or more measurements of the plurality of candidate beams, as described above. In some aspects, the operation of block 710 may be performed by determination component 906 of FIG. 9.

As further shown in FIG. 7, in some aspects, process 700 may include transmitting an indication of the first beam and the second beam to the base station (block 730). For example, the UE (e.g., using receive processor 258, transmit processor 264, controller/processor 280, memory 282, and/or the like) may transmit an indication of the first beam and the second beam to the base station, as described above. In some aspects, the operation of block 710 may be performed by transmission component 908 of FIG. 9.

Process 700 may include additional aspects, such as any single aspect or any combination of aspects described below and/or in connection with one or more other processes described elsewhere herein.

In a first aspect, determining the first beam and the second beam includes determining whether a candidate beam is associated with a respective set of beams.

In a second aspect, alone or in combination with the first aspect, each of the plurality of candidate beams is associated with a respective set of beams, and the first beam and the second beam are from different sets of beams.

In a third aspect, alone or in combination with one or more of the first and second aspects, the indication of the plurality of candidate beams includes a plurality of indices that each correspond to a respective beam in the plurality of candidate beams.

In a fourth aspect, alone or in combination with one or more of the first through third aspects, process 700 includes receiving a message from the base station, the message indicating a mapping between the plurality of indices and respective beams in the plurality of candidate beams.

In a fifth aspect, alone or in combination with one or more of the first through fourth aspects, the indication of the plurality of candidate beams includes a plurality of indices that each correspond to a respective set of beams in the plurality of candidate beams.

In a sixth aspect, alone or in combination with one or more of the first through fifth aspects, process 700 includes receiving a message from the base station, the message indicating a mapping between the plurality of indices and respective sets of beams in the plurality of candidate beams.

In a seventh aspect, alone or in combination with one or more of the first through sixth aspects, the indication of the plurality of candidate beams includes an index that corresponds to identifiers for beams in the plurality of candidate beams, and determining the first beam and the second beam includes determining the first beam and the second beam from among beams with identifiers that correspond to the index.

In an eighth aspect, alone or in combination with one or more of the first through seventh aspects, process 700 includes receiving a message from the base station, the message indicating a mapping between the index and the identifiers.

In a ninth aspect, alone or in combination with one or more of the first through eighth aspects, determining the first beam and the second beam includes determining the first beam and the second beam based at least in part on an order of the plurality of candidate beams in the indication of the plurality of candidate beams.

In a tenth aspect, alone or in combination with one or more of the first through ninth aspects, process 700 includes receiving a message from the base station, the message indicating a mapping between the order of the plurality of candidate beams and respective sets of beams in the plurality of candidate beams In an eleventh aspect, alone or in combination with one or more of the first through tenth aspects, receiving the indication of the plurality of candidate beams includes receiving the indication of the plurality of candidate beams in one or more of a CRI or a synchronization signal physical broadcast channel resource block indicator.

In a twelfth aspect, alone or in combination with one or more of the first through eleventh aspects, receiving the indication of the plurality of candidate beams includes receiving the indication of the plurality of candidate beams in one or more of an RRC message, a MAC-CE, or DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
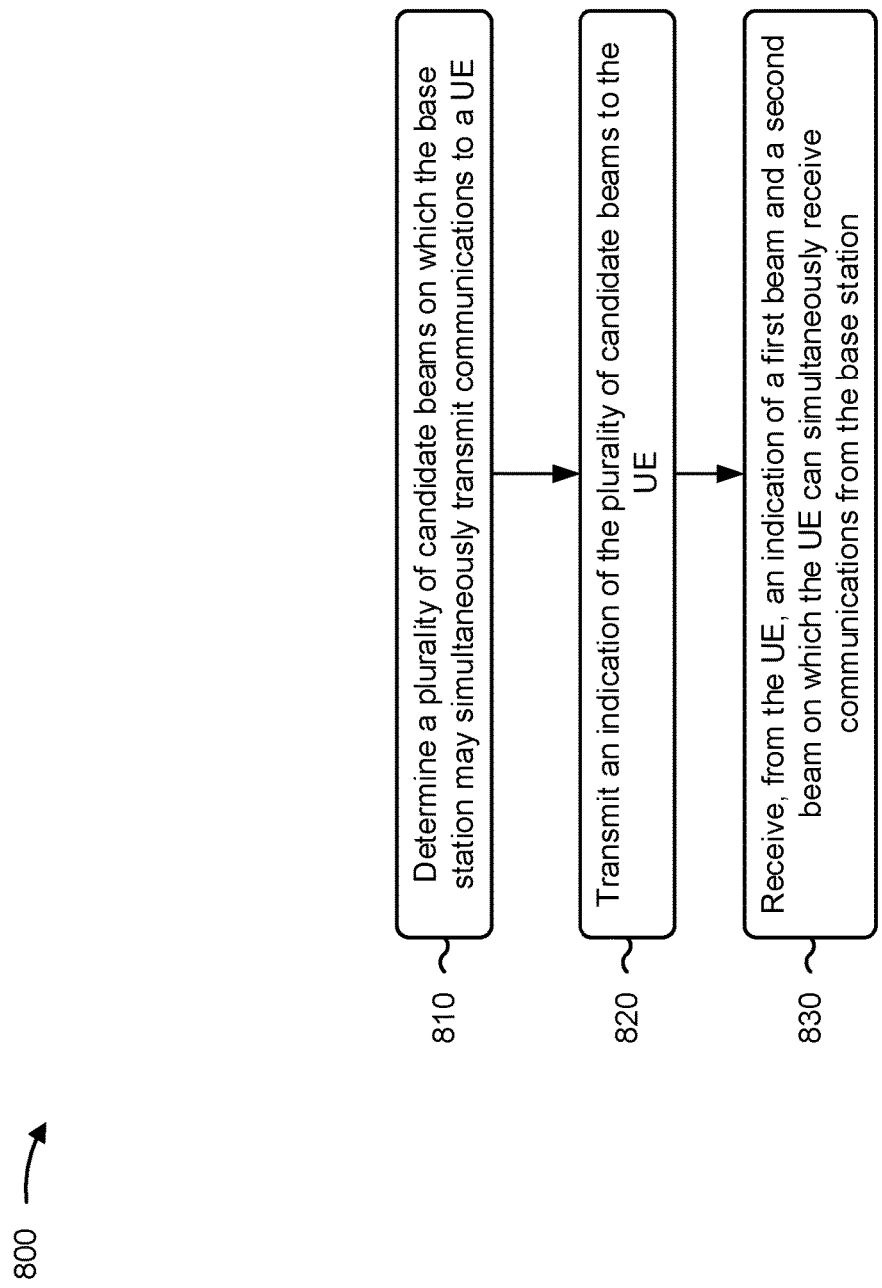
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., BS 110 depicted in FIGS. 1 and 2, the gNB depicted in FIGS. 3 and 4, BS 510 depicted in FIGS. 5 and 6, and/or the like) performs operations associated with techniques for indicating beams for user equipment beam reporting.

As shown in FIG. 8, in some aspects, process 800 may include determining a plurality of candidate beams on which the base station may simultaneously transmit communications to a UE (block 810). For example, the base station (e.g., using transmit processor 220, receive processor 238, controller/processor 240, memory 242, and/or the like) may determine a plurality of candidate beams on which the base station may simultaneously transmit communications to a UE, as described above. In some aspects, the operation of block 810 may be performed by determination component 1006 of FIG. 10.

As further shown in FIG. 8, in some aspects, process 800 may include transmitting an indication of the plurality of candidate beams to the UE (block 820). For example, the base station (e.g., using transmit processor 220, receive processor 238, controller/processor 240, memory 242, and/or the like) may transmit an indication of the plurality of candidate beams to the UE, as described above. In some aspects, the operation of block 820 may be performed by transmission component 1008 of FIG. 10.

As further shown in FIG. 8, in some aspects, process 800 may include receiving, from the UE, an indication of a first beam and a second beam on which the UE can simultaneously receive communications from the base station (block 830). For example, the base station (e.g., using transmit processor 220, receive processor 238, controller/processor 240, memory 242, and/or the like) may receive, from the UE, an indication of a first beam and a second beam on which the UE can simultaneously receive communications from the base station, as described above. In some aspects, the operation of block 830 may be performed by reception component 1004 of FIG. 10.

Process 800 may include additional aspects, such as any single aspect or any combination of aspects described below and/or in connection with one or more other processes described elsewhere herein.

In a first aspect, each of the plurality of candidate beams is associated with a respective set of beams, and the first beam and the second beam are from different sets of beams.

In a second aspect, alone or in combination with the first aspect, the indication of the plurality of candidate beams includes a plurality of indices that each correspond to a respective beam in the plurality of candidate beams.

In a third aspect, alone or in combination with one or more of the first and second aspects, process 800 includes transmitting a message to the UE, the message indicating a mapping between the plurality of indices and respective beams in the plurality of candidate beams.

In a fourth aspect, alone or in combination with one or more of the first through third aspects, the indication of the plurality of candidate beams includes a plurality of indices that each correspond to a respective set of beams in the plurality of candidate beams.

In a fifth aspect, alone or in combination with one or more of the first through fourth aspects, process 800 includes transmitting a message to the UE, the message indicating a mapping between the plurality of indices and respective sets of beams in the plurality of candidate beams.

In a sixth aspect, alone or in combination with one or more of the first through fifth aspects, transmitting the indication of the plurality of candidate beams includes transmitting the indication of the plurality of candidate beams in one or more of a CRI or a synchronization signal physical broadcast channel resource block indicator.

In a seventh aspect, alone or in combination with one or more of the first through sixth aspects, transmitting the indication of the plurality of candidate beams includes transmitting the indication of the plurality of candidate beams in one or more of an RRC message, a MAC-CE, or DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
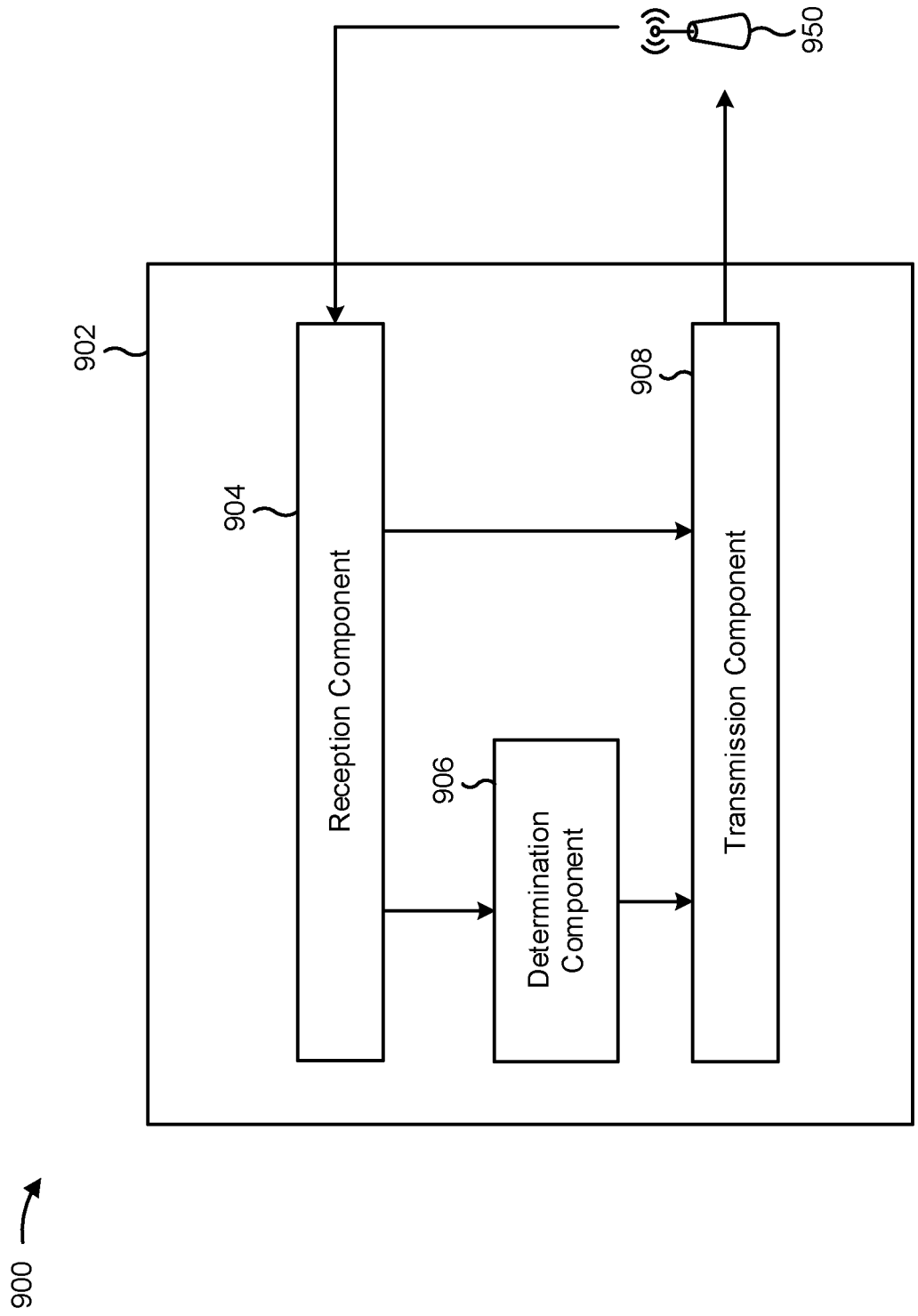
FIG. 9 is a conceptual data flow diagram illustrating a data flow between different components in an example apparatus.

FIG. 9 is a conceptual data flow diagram 900 illustrating a data flow between different components in an example apparatus 902. The apparatus 902 may be a UE (e.g., UE 120). In some aspects, the apparatus 902 includes a reception component 904, a determining component 906, and/or a transmission component 908.

In some aspects, reception component 904 receives, from BS 950, an indication of a plurality of candidate beams on which BS 950 is able to simultaneously transmit communications to apparatus 902, and passes the indication to determination component 906. Determination component 906 determines a first beam and a second beam from among the plurality of candidate beams, based at least in part on one or more measurements of the plurality of candidate beams. Determination component 906 passes the indication of the first beam and the second beam to transmission component 908. Transmission component 908 transmits the indication of the first beam and the second beam to BS 950. Reception component 904 may receive communications simultaneously on the first beam and the second beam.

The apparatus may include additional components that perform each of the blocks of the algorithm in the aforementioned process 700 of FIG. 7, process 800 of FIG. 8, and/or the like. Each block in the aforementioned process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
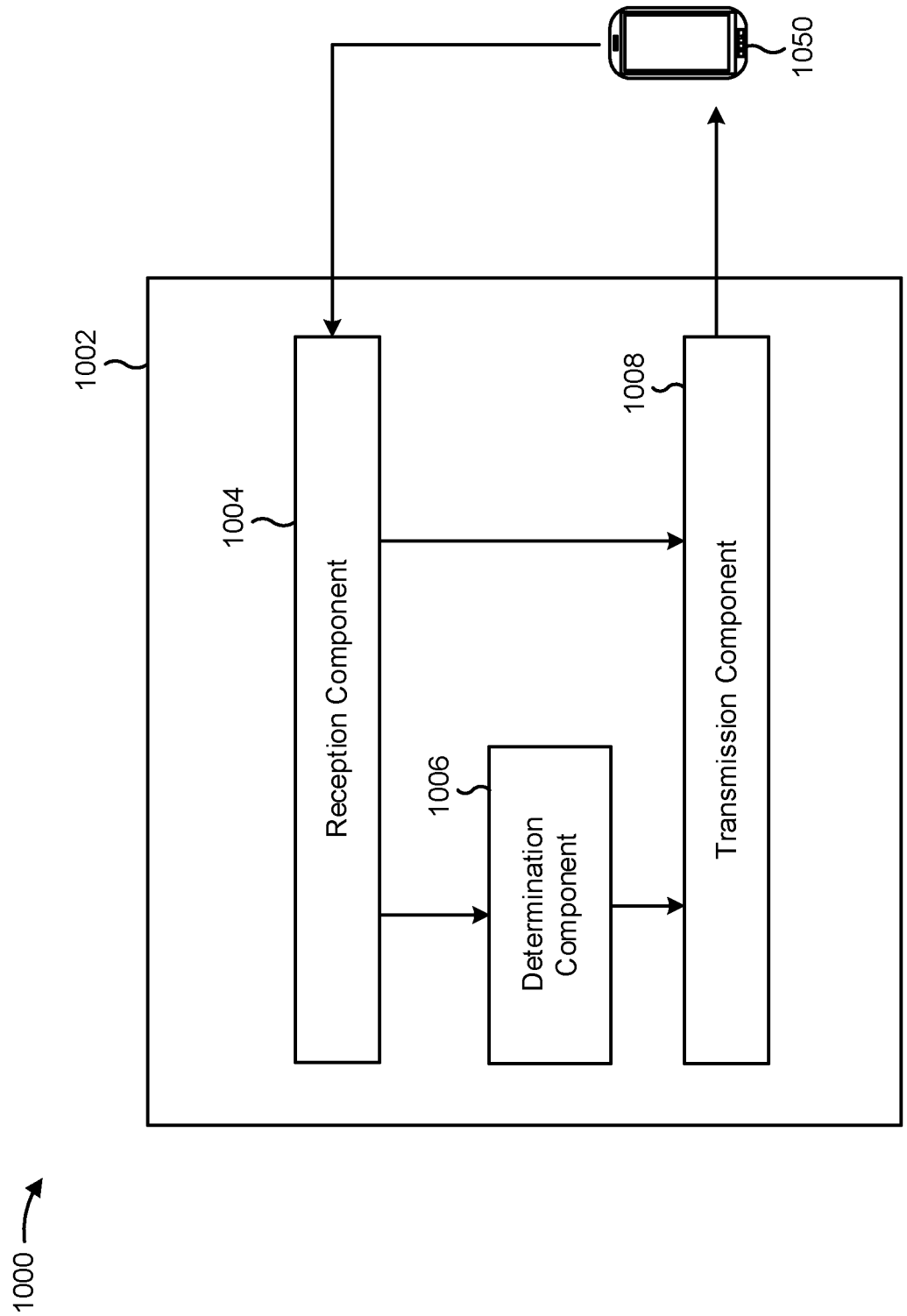
FIG. 10 is a conceptual data flow diagram illustrating a data flow between different components in an example apparatus.

FIG. 10 is a conceptual data flow diagram 1000 illustrating a data flow between different components in an example apparatus 1002. The apparatus 1002 may be a base station (e.g., base station 110). In some aspects, the apparatus 1002 includes a reception component 1004, a determination component 1006, and/or a transmission component 1008.

In some aspects, reception component 1004 receives a message from a UE 1050. Reception component 1004 transmits the message to determination component 1006, which determines a plurality of candidate beams on which apparatus 1002 is able to simultaneously transmit communications to UE 1050. Determination component 1006 transmits an indication of the plurality of candidate beams to transmission component 1008. Transmission component 1008 transmits the indication of the plurality of candidate beams to UE 1050. Reception component 1004 may receive an indication of a first beam and second beam on which UE 1050 may simultaneously receive communications. Reception component 1004 may transmit the indication to transmission component 1008, which may transmit communications simultaneously on the first beam and the second beam.

The apparatus may include additional components that perform each of the blocks of the algorithm in the aforementioned process 700 of FIG. 7, process 800 of FIG. 8, and/or the like. Each block in the aforementioned process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, from a network entity, a non-zero-power Channel State Information Reference Signal resource set (NZP-CSI-RS-ResourceSet) information element that indicates a plurality of resource sets, wherein the NZP-CSI-RS-ResourceSet information element indicates a beam set index corresponding to a resource set of the plurality of resource sets;
    determining, based at least in part on one or more measurements of one or more resources of the plurality of resource sets, a first resource of a first resource set of the plurality of resource sets and a second resource of a second resource set of the plurality of resource sets; and
    transmitting a channel state information (CSI) report of the first resource and the second resource.

2. The method of claim 1, wherein determining the first resource and the second resource includes determining whether a candidate resource is associated with the first resource set.

3. The method of claim 1, wherein the NZP-CSI-RS-ResourceSet information element includes a plurality of indices that each correspond to a respective beam in the plurality of resource sets.

4. The method of claim 1, wherein the NZP-CSI-RS-ResourceSet information element includes a plurality of indices that correspond to the plurality of resource sets, and wherein the plurality of indices include the beam set index.

5. The method of claim 1, wherein the NZP-CSI-RS-ResourceSet information element includes the beam set index,
    wherein the beam set index corresponds to identifiers for resources in resource set, and
    wherein determining the first resource and the second resource includes determining the first resource and the second resource from among resources with identifiers that correspond to the beam set index.

6. The method of claim 1, wherein determining the first resource and the second resource includes determining the first resource and the second resource based at least in part on an order of the plurality of resource sets in the NZP-CSI-RS-ResourceSet information element.

7. The method of claim 6, further comprising receiving a message from the network entity, the message indicating a mapping between the order of the plurality of resource sets and respective resource sets in the plurality of resource sets.

8. The method of claim 1, wherein receiving the NZP-CSI-RS-ResourceSet information element includes receiving the NZP-CSI-RS-ResourceSet information element in one or more of a channel state information reference signal resource indicator or a synchronization signal physical broadcast channel resource block indicator.

9. A method of wireless communication performed by a network entity, comprising:
    determining a plurality of resource sets;
    transmitting a non-zero-power Channel State Information Reference Signal resource set (NZP-CSI-RS-ResourceSet) information element that indicates the plurality of resource sets, wherein the NZP-CSI-RS-ResourceSet information element indicates a beam set index corresponding to a resource set of the plurality of resource sets; and receiving, from a user equipment (UE), a channel state information (CSI) report of a first resource of a first resource set of the plurality of resource sets and a second resource of a second resource set of the plurality of resource sets.

10. The method of claim 9, wherein the NZP-CSI-RS-ResourceSet information element includes a plurality of indices that each correspond to a respective resource in the plurality of resource sets.

11. The method of claim 9, wherein the NZP-CSI-RS-ResourceSet information element includes a plurality of indices that correspond to the plurality of resource sets, and wherein the plurality of indices include the beam set index.

12. The method of claim 9, further comprising ordering resources of the plurality of resource sets in the NZP-CSI-RS-ResourceSet information element based at least in part on a priority of availability for the network entity.

13. The method of claim 12, further comprising transmitting a message to the UE, the message indicating a mapping between an order of the plurality of resource sets in the NZP-CSI-RS-ResourceSet information element and respective resources of the plurality of resource sets.

14. The method of claim 9, wherein transmitting the NZP-CSI-RS-ResourceSet information element includes transmitting the NZP-CSI-RS-ResourceSet information element in one or more of a channel state information reference signal resource indicator or asynchronization signal physical broadcast channel resource block indicator.

15. A user equipment (UE) for wireless communication, comprising:
one or more memories; and
one or more processors coupled to the one or more memories, the one or more processors configured to:
receive, from a network entity, a non-zero-power Channel State Information Reference Signal resource set (NZP-CSI-RS-ResourceSet) information element that indicates a plurality of resource sets, wherein the NZP-CSI-RS-ResourceSet information element indicates a beam set index corresponding to a resource set of the plurality of resource sets;
determine, based at least in part on one or more measurements of one or more resources of the plurality of resource sets, a first resource of a first resource set of the plurality of resource sets and a second resource of a second resource set of the plurality of resource sets; and
transmit a channel state information (CSI) report of the first resource and the second resource.

16. The UE of claim 15, wherein the one or more processors are configured to determine the first resource and the second resource by determining whether a candidate beam is associated with the first resource set.

17. The UE of claim 15, wherein the NZP-CSI-RS-ResourceSet information element includes a plurality of indices that each correspond to a respective resource in the plurality of resource sets.

18. The UE of claim 15, wherein the NZP-CSI-RS-ResourceSet information element includes a plurality of indices that correspond to the plurality of resource sets, and wherein the plurality of indices include the beam set index.

19. The UE of claim 15, wherein the CSI report of the first resource and the second resource comprises an indication of the first resource and the second resource on which the UE can simultaneously receive communications.

20. The UE of claim 15, wherein the first resource comprises one or more of a channel state information reference signal (CSI-RS) resource or a synchronization signal block (SSB) resource.

21. The UE of claim 15, wherein the first resource is a resource of a group, and
wherein the one or more processors are further configured to:
identify information regarding simultaneous processing related to the group.

22. The UE of claim 15, wherein the first resource is associated with information regarding simultaneous processing related to a group that includes the first resource.

23. The UE of claim 22, wherein the group is a candidate beam set.

24. The UE of claim 15, wherein the resource set is the first resource set or the second resource set.

25. The UE of claim 15, wherein the NZP-CSI-RS-ResourceSet information element includes the beam set index.

26. The UE of claim 15, wherein the beam set index corresponds to identifiers for resources in the resource set.

27. The UE of claim 15, wherein, to determine the first resource and the second resource, the one or more processors are configured to:
determine the first resource and the second resource from among resources with identifiers that correspond to the beam set index.

28. A network entity for wireless communication, comprising:
one or more memories; and
one or more processors, coupled to the one or more memories, configured to:
determine a plurality of resource sets;
transmit a non-zero-power Channel State Information Reference Signal resource set (NZP-CSI-RS-ResourceSet) information element that indicates the plurality of resource sets, wherein the NZP-CSI-RS-ResourceSet information element indicates a beam set index corresponding to a resource set of the plurality of resource sets; and
receive, from a user equipment (UE), a channel state information (CSI) report of a first resource of a first resource set of the plurality of resource sets and a second resource of a second resource set of the plurality of resource sets.

29. The network entity of claim 28, wherein the NZP-CSI-RS-ResourceSet information element includes a plurality of indices that each correspond to a respective resource in the plurality of resource sets sets.

30. The network entity of claim 28, wherein the NZP-CSI-RS-ResourceSet information element includes a plurality of indices that correspond to the plurality of resource sets, and
wherein the plurality of indices include the beam set index.

31. The network entity of claim 28, wherein the one or more processors are further configured to:
order resource sets of the plurality of resource sets in the NZP-CSI-RS-ResourceSet information element based at least in part on a priority of availability for the network entity; and transmit a message to the UE, the message indicating a mapping between an order of the plurality of resource sets in the NZP-CSI-RS-ResourceSet information element and respective resource sets of the plurality of resource sets.

\* \* \* \* \*